US006488387B2

(12) United States Patent
Wardenburg

(10) Patent No.: US 6,488,387 B2
(45) Date of Patent: Dec. 3, 2002

(54) ADJUSTABLE HEIGHT GROW LIGHT

(75) Inventor: Peter Wardenburg, Sonoma County, CA (US)

(73) Assignee: Hydrofarm, Petaluma, CA (US)

( * ) Notice: Subject to any disclaimer, the term of this patent is extended or adjusted under 35 U.S.C. 154(b) by 0 days.

(21) Appl. No.: 09/929,628

(22) Filed: Aug. 13, 2001

(65) Prior Publication Data

US 2002/0021568 A1 Feb. 21, 2002

Related U.S. Application Data

(60) Provisional application No. 60/224,342, filed on Aug. 11, 2000.

(51) Int. Cl.$^7$ ............................................... F21V 19/02
(52) U.S. Cl. ..................... 362/220; 362/431; 362/285; 362/289; 362/402; 362/403; 362/414
(58) Field of Search .............................. 362/220, 285, 362/288, 289, 413, 414, 431, 402, 403, 805

(56) References Cited

U.S. PATENT DOCUMENTS 4,851,980 A * 7/1989 McWilliams et al. ....... 254/285
5,299,952 A * 4/1994 Hinds, Jr. ................... 362/403
5,519,597 A * 5/1996 Tsai ........................... 248/328

* cited by examiner

Primary Examiner—Sandra O'Shea
Assistant Examiner—Mark Tsidulko
(74) Attorney, Agent, or Firm—Larry D. Johnson; Craig M. Stainbrook; Johnson & Stainbrook, LLP

(57) ABSTRACT

An adjustable height grow light for easy manual adjustment of the vertical position of the light fixture. The light includes a light stand having two vertical supports and a horizontal support connected to the vertical supports and defining an interior channel containing the operative elements of the light. Hanging from the vertical support is a light fixture adapted for holding at least one grow light. A ribbon torsion spring is secured within the interior channel of the horizontal support member on a ribbon spring axle. In series are first and second axles secured with the interior channel of the horizontal support, and first line and second lines are connected to the ribbon torsion spring at one end and to the light fixture at the other end. The first line is routed over the second axle and looped back to and over the first axle; the second line is routed over the second axle only. The ribbon torsion spring has a tension rating that permits easy manual positioning of the light fixture.

19 Claims, 7 Drawing Sheets

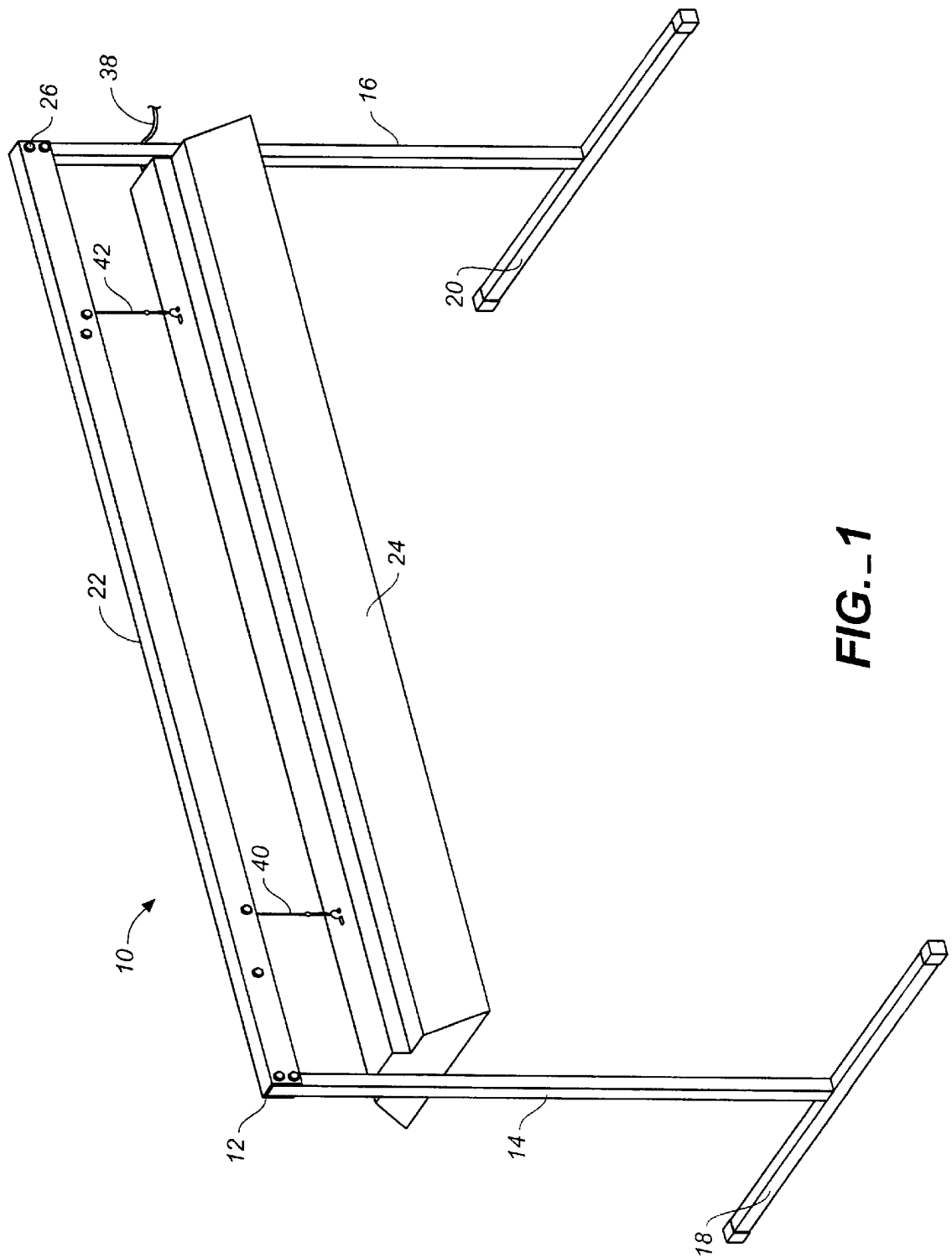
FIG._1

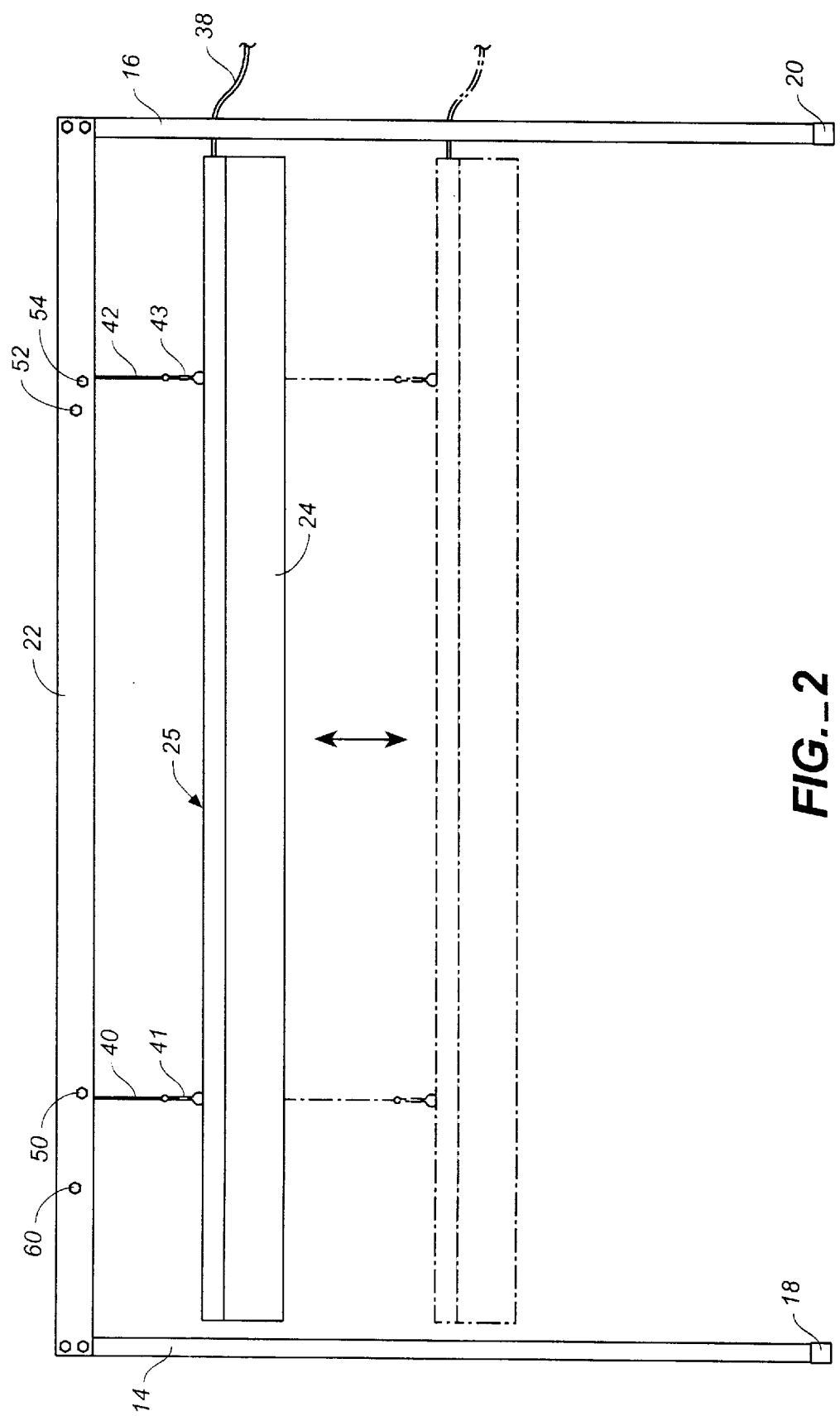
FIG._2

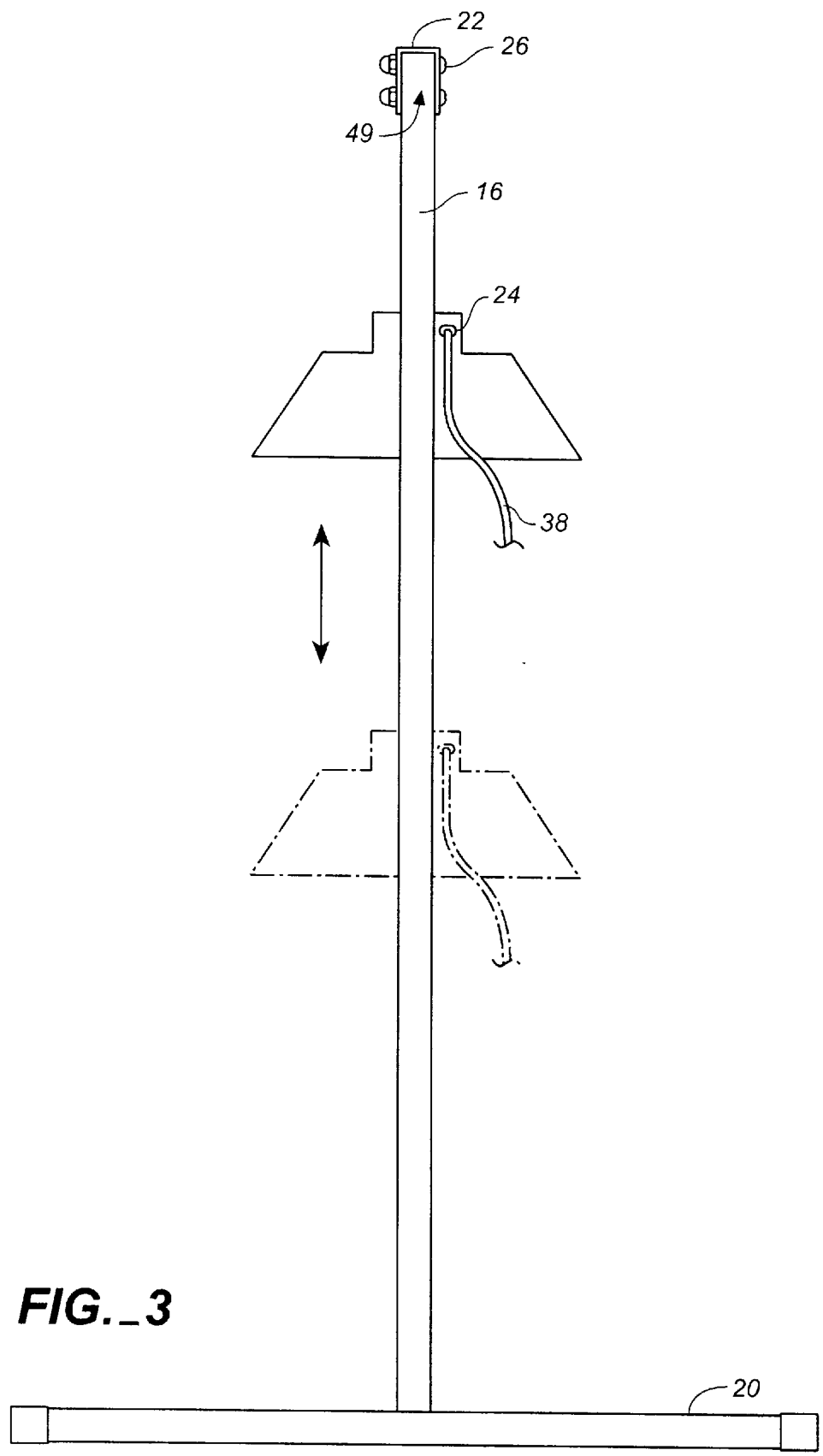
FIG._3

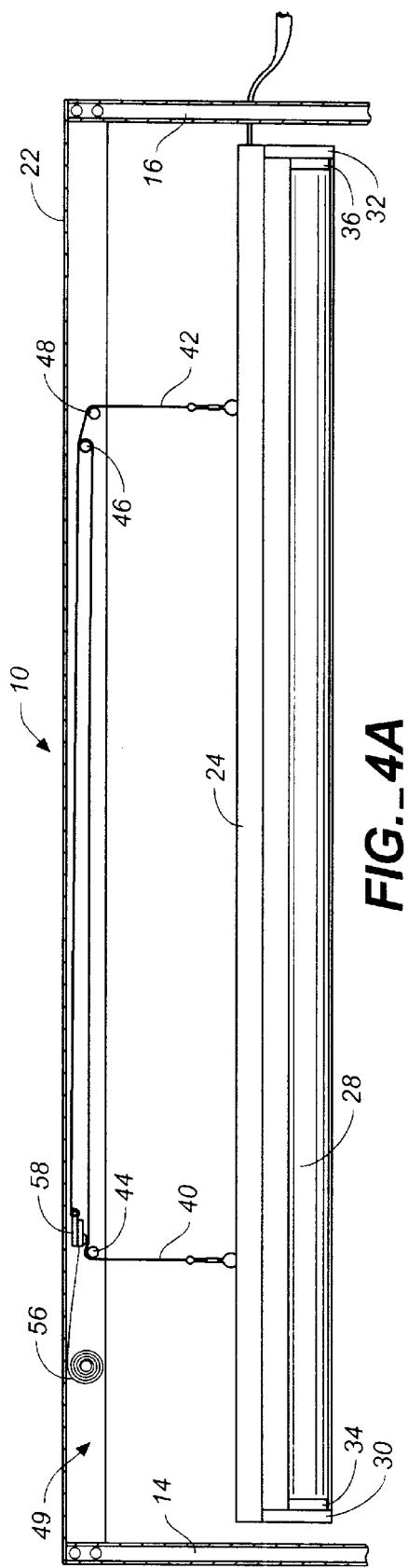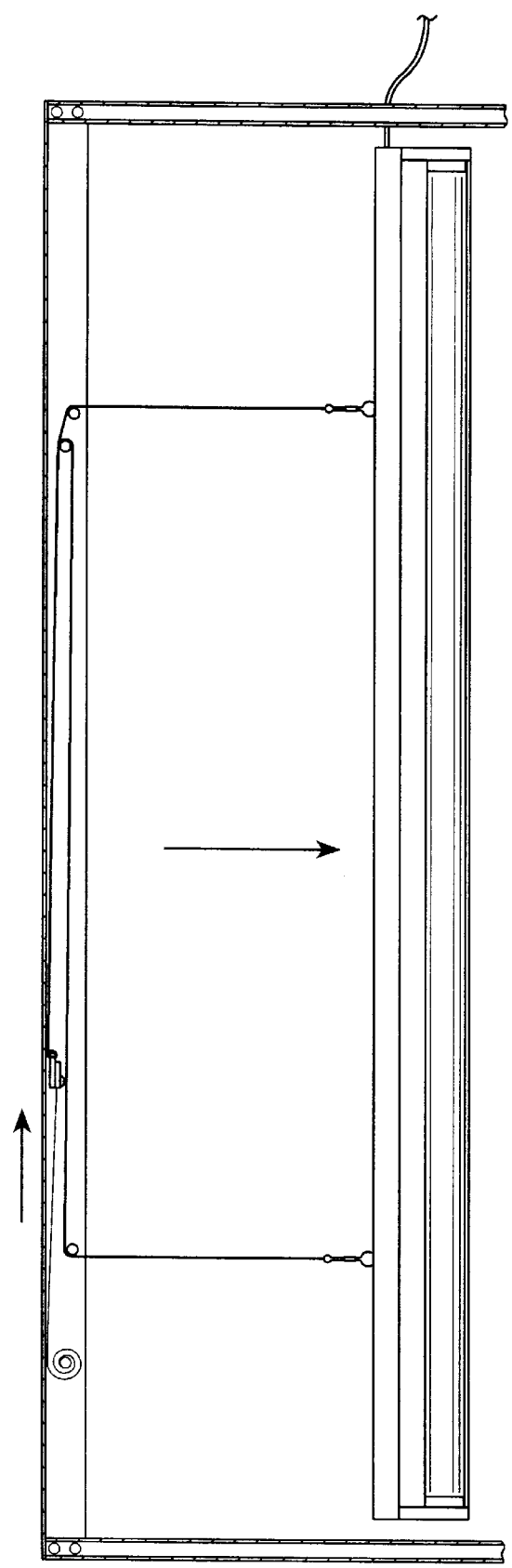
FIG._4A
FIG._4B

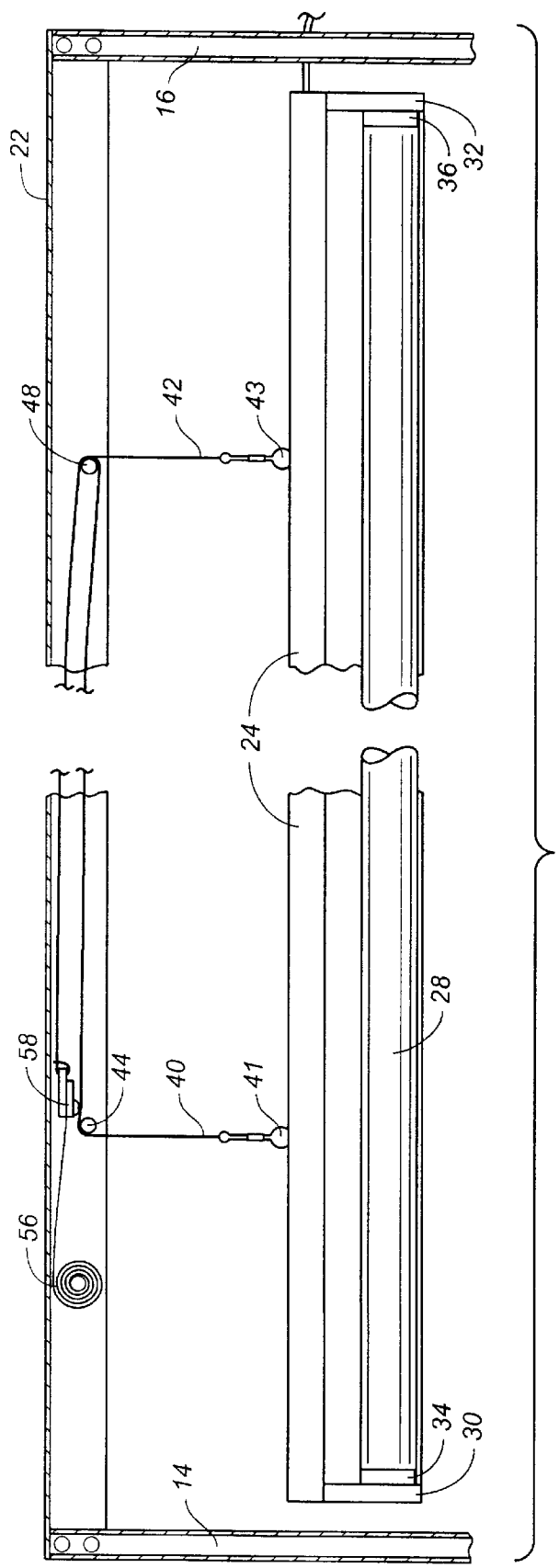

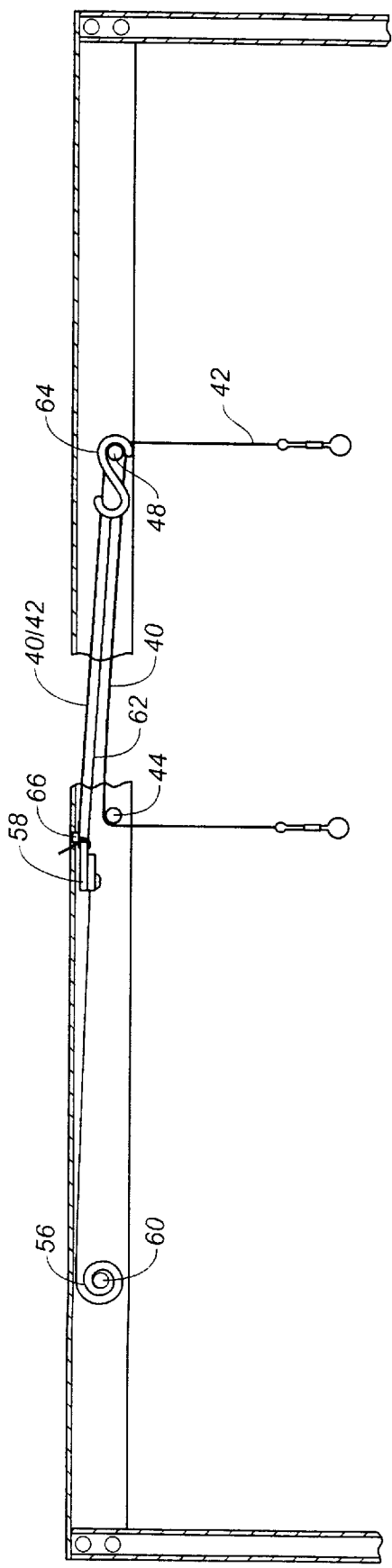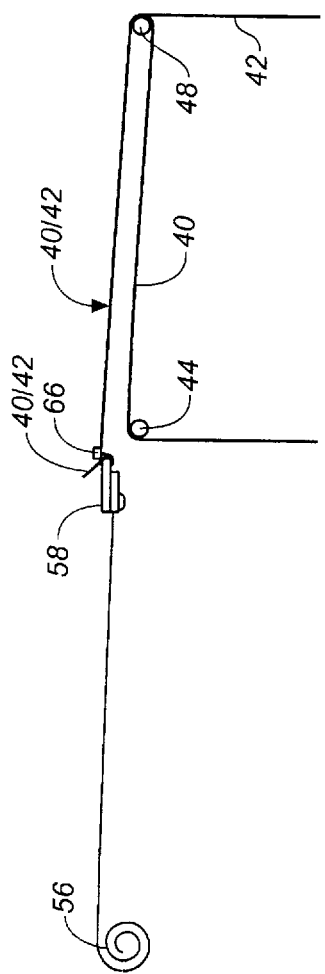

ADJUSTABLE HEIGHT GROW LIGHT

CROSS REFERENCE TO RELATED APPLICATIONS

The present application claims the benefit of the filing date of U.S. provisional application Ser. No. 60/224,342, filed Aug. 11, 2000.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention relates generally to light fixtures, and more particularly to an adjustable height light fixture adaptable for use as a grow light.

2. Discussion of Related Art

The use of conventional fluorescent light fixtures for grow lights is well known. The fixtures commonly retain long tubular bulbs in a housing member positioned in proximity to growing plants to provide optimum illumination for germination and growth. Illumination and incidental heat from the light may be controlled through shading, on-off cycles, or simply by positioning the light more closely or further from the plants. Accordingly, some grow light systems provide a degree of flexibility in positioning the light fixture relative to the plants. However, there is as yet unknown to the present inventor a hanging tubular bulb grow light fixture that provides infinite overhead (vertical) adjustability. The adjustable height light fixture of the present invention provides such an advantage.

SUMMARY OF THE INVENTION

According to the present invention, there is provided an adjustable height grow light having infinite vertical adjustability with only the slightest force applied either to raise the light or to lower it. The preferred embodiments of the light include a light stand having vertical support members and horizontal feet and for stabilizing the stand, and a horizontal support member interposed between the vertical support members from which a light fixture hangs. A first line is routed over a first line axle and rotatable axle sleeve and a shared or common axle and axle sleeve, and a second line is routed over a second line axle and rotatable axle sleeve, and also over the shared axle sleeve. After passing over the shared axle sleeve, each of the lines is connected to a constant force ribbon torsion spring with a coupling block. The ribbon torsion spring is set within the horizontal support member on fourth fixed axle. In a second preferred embodiment the common axle sleeve and shaft are eliminated.

In each of the preferred embodiments, the constant force ribbon torsion spring is selected and fabricated to have a tension rating slightly exceeding the total weight of the light fixture and installed bulbs. This permits the fixture to be moved upwardly and downwardly with very little force and to remain securely in place at any of an infinite number of selected positions within its range without the use of position locking means. The fixture remains level due to the line scheme employed.

BRIEF DESCRIPTION OF THE SEVERAL VIEWS OF THE DRAWINGS

FIG. 1 is a perspective view of the adjustable height grow light of the present invention;

FIG. 2 is a side elevation view of the apparatus of FIG. 1;

FIG. 3 is an end view of the apparatus as depicted in FIG. 2, showing the light in the elevated position, and showing it in a lowered position in phantom;

FIG. 4A is a side elevation cross-sectional view of the apparatus of FIG. 1, shown in an elevation position with the constant force ribbon torsion spring in a retracted position;

FIG. 4B is a side elevation cross-sectional view of the light shown in a lowered position with the constant force ribbon torsion spring partly extended;

FIG. 5A is a side elevation cross-sectional view of the a second preferred embodiment of the inventive light, showing an alternative string scheme, with the light housing shown in its elevated position;

FIG. 6 is a side view in elevation showing an alternative line scheme adapted for use with the second preferred embodiment, showing line and spring adjustment means; and FIG. 7 is a side elevation view showing detail of the line stringing scheme of the first preferred embodiment, and more particularly showing an alternative line adjustment means on the spring coupling block.

DETAILED DESCRIPTION OF THE PREFERRED EMBODIMENTS

Figure 5B:
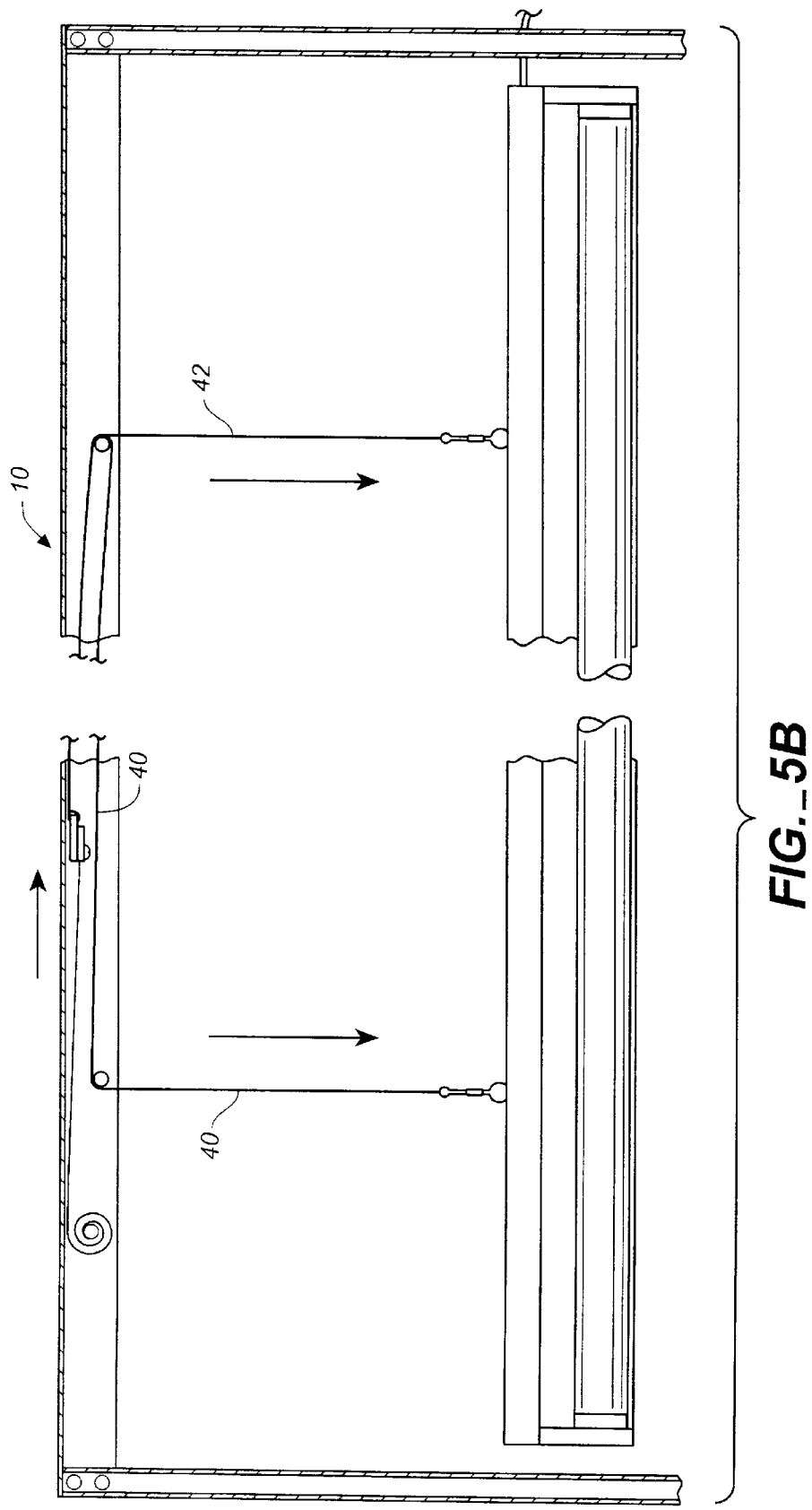
FIG. 5B is a detailed view of the light as shown in FIG. 5A, showing how the light remains level when lowered.

Referring to FIGS. 1 through 7, wherein like reference numerals refer to like components in the various views, FIG. 1 is a perspective view showing the most general features of the adjustable height grow light of the present invention. FIGS. 2 and 3, respectively, are side and end elevation views thereof. FIGS. 4A and 4B are cross-sectional side elevation views thereof, showing the light in a raised and a lowered position. These views collectively show that the adjustable height grow light 10 of the present invention comprises a light stand 12, preferably having first and second vertical support members, 14 and 16, horizontal feet 18 and 20 for stabilizing the stand, and a horizontal support member 22 interposed between the vertical support members and from which the light fixture 24 hangs. The vertical support members and feet are preferably fabricated from lightweight aluminum square or rectangular sections and are coupled either with suitable metal fasteners or through a braze or weld. The horizontal support member is preferably fabricated from lightweight aluminum U-section defining an interior, or downwardly depending channel, for the containment of the operative elements of the structure and having an open bottom side. The vertical and horizontal support members are preferably joined by conventional bolts and nuts 26.

The light fixture 24 holds at least one, but preferably two or more conventional tubular grow light bulbs 28 electrically connected at each end 30 and 32 of the light fixture to conventional light bracket/two-pin connectors 34 and 36 mounted therein. The connectors are, in turn, coupled to a 120 VAC power source via electric cord 38, with a ballast (not shown) interposed between the power and the connectors, as is well known in the art.

At its upper surface 25, light fixture 24 is connected to a first line 40 and a second line 42, by means of any of a number of suitable means, including a pair of hooks and clips 41 and 43. The first line 40 is routed over a first line axle sleeve 44 and a shared or common axle sleeve 46, and the second line is routed over a second line axle sleeve 48, and also over the shared axle sleeve 46. The axle sleeves are rotatably secured on fixed axles within the channel 49 defined by the inverted U-shaped horizontal support member, the first line axle sleeve on a first line axle 50, the shared (or common) axle sleeve on a second line axle 52, and the second line axle sleeve on a third line axle 54. After passing over the shared axle sleeve, each of the lines is connected to a constant force ribbon torsion spring 56 via a coupling block 58. The ribbon torsion spring is set within the horizontal support member on a ribbon spring axle 60, also set within the U-shaped horizontal support member. Accordingly, moving from the ribbon tension spring outward toward the light fixture, the first line is routed over second line axle 52 then looped back to first line axle 44, and thereafter is downwardly disposed toward the light fixture; the second line is routed over second line axle 52, then over third line axle 54, and is thereafter downwardly disposed toward the light fixture.

As may be noted in the drawings, the line axles are positioned in a linear series, parallel to and in varying proximity to the ribbon torsion spring axle, the first line axle most proximate the ribbon spring axle, the common line axle next in proximity, and the second line axle most remote. The line stringing scheme ensures that the lines are equally let out and pulled in by the extension and retraction of the ribbon torsion spring such that the fixture remains substantially level when moved up and down.

In a second preferred embodiment of the present invention, shown in FIGS. 5A and 5B, the common axle is eliminated and second axle sleeve 48 and axle 54 function as the common axle for lines 40 and 42. Thus, the second line is disposed downwardly toward the fixture after axle 54. Otherwise the line stringing scheme is identical to that of the first preferred embodiment.

FIG. 6 is a side view in elevation showing the line stinging scheme of the second preferred embodiment described supra, showing line and spring adjustment means. To define the range and tension of the ribbon spring 56 and the range of movement of the light fixture, a third line 62 may be connected to a connector 64, preferably an S-hook, which fastens to the common axle at one end and to the spring coupling block 58 at its other end. The third line is fastened to the coupling block at an adjustment bolt 66 threadably driven into the coupling block and which may be loosened to allow slack to be taken up or let out; the more slack taken up and the further out the ribbon spring is thereby pulled, the shorter the range of motion of the fixture. Additionally, the uppermost point in the fixture's vertical movement can be selected by letting out or taking up slack in both lines 40 and 42, either independently of, or concurrently with an adjustment in third line 62. Thus, both the range of movement and the uppermost point in the range of movement can be finely adjusted using this line stringing scheme.

FIG. 7 is a side elevation view showing detail of the line stringing scheme of the first preferred embodiment, and more particularly showing an alternative line adjustment system on the spring coupling block. In this system, the third line is eliminated and adjustments are made simply by letting out or taking up slack through connection bolt 66. This results only in setting the uppermost point of movement in the range of movement of the light fixture.

The light fixture 24 is preferably fabricated from light-gauge sheet plastic or steel or another suitably sturdy material and comprises a two lamp troffer with sloping sides. The constant force ribbon torsion spring employed in the inventive device is selected to have a tension rating slightly exceeding the total weight of the light fixture and installed bulbs. This permits the fixture to be moved upwardly and downwardly with very little manual force and to remain in place at any of an infinite number of selected positions within its range without the use of position locking means. As will be readily appreciated from FIGS. 4A through 5B, the light fixture remains level in its movement owing to the operational configuration of the axle system.

Reduced to its essence, the adjustable height grow light of the present invention comprises a horizontal support adaptable for connection to a support. The support could comprise vertical supports of the kind depicted in FIGS. 1–3, but the horizontal support is also well suited for suspension from a ceiling or for direct connection to a ceiling. The horizontal support need only define a downwardly depending interior channel for containment of the operative elements, which include a spring axle, a constant force ribbon torsion spring mounted on the spring axle and able to extend from and retract back to the spring axle from an extended position, at least two line axles spaced apart from the spring axle and from one another, a light fixture adapted for holding grow light bulbs, and an assembly of at least two lines each which is connected at one end to the ribbon torsion spring and at the other end to the light fixture, and routed over the line axles such that when the ribbon torsion spring is extended or retracted, each of the lines is let out or taken in in substantially the same amount. The ribbon torsion spring must be tension rated at or slightly above the weight of the light fixture and bulbs so that the fixture will remain securely in a selected position, but may also be moved quite easily from one position to another with little manual force.

While this invention has been described in connection with preferred embodiments thereof, it is obvious that modifications and changes therein may be made by those skilled in the art to which it pertains without departing from the spirit and scope of the invention. For example, it would be obvious to one having ordinary skill in the art to couple the light fixture to a second or possibly several light fixtures through a connecting bracket to provide a set of side-by-side fixtures all hanging from the first and second lines. This would permit a substantial increase in light output without altering the function of the height adjustment mechanism. Naturally, the sturdiness of the supports and the rating of the ribbon torsion spring would have to be tailored to the increased weight, but precisely this kind of customization is contemplated in the inventive system. Additionally, it would be obvious to those skilled in the art to fabricate the operative elements of the present invention according to the overall mass of the fixture. The kind and rating of the lines would be varied accordingly. Thus, if a heavy light fixture were employed, lines could be made of wire, steel cable, wire rope, nylon cord, and so forth. For lighter fixtures, simple lightweight cord or string could be employed.

Accordingly, the scope of this invention is to be limited only by the appended claims.

What is claimed as invention is:

1. An adjustable height grow light, comprising:
   a light stand having at least one vertical support;
   a horizontal support connected to said vertical support and having an interior channel;
   a light fixture adapted for holding at least one grow light, said light fixture having an upper surface;
   a ribbon torsion spring axle secured with the interior channel of said horizontal support on a ribbon spring axle;
   a ribbon torsion spring disposed on said ribbon spring axle;

a first axle secured with the interior channel of said horizontal support;

a second axle secured with the interior channel of said horizontal support and spaced apart from said ribbon spring axle and said first axle; and a first line and a second line, each of said lines connected to said ribbon torsion spring at one end and to said light fixture at the other end, said first line routed over said second axle and looped back to and over said first axle and thereafter disposed downwardly to said light fixture, said second line routed over said second axle only and thereafter disposed downwardly to said light fixture;

wherein said ribbon torsion spring has a tension rating greater than the weight of said first and second lines and said light fixture and any lights contained therein, and wherein said light fixture may be manually moved vertically up and down.

2. The adjustable height grow light of claim 1, wherein said vertical support includes two vertical support members, and wherein said horizontal support is interposed between said vertical support members.

3. The adjustable height grow light of claim 2, wherein said vertical support members include feet, and wherein said vertical support members and said feet are fabricated from lightweight aluminum.

4. The adjustable height grow light of claim 1, wherein said horizontal support is a member having a U-shaped cross-section, and wherein the channel defined by said horizontal support is disposed downwardly.

5. The adjustable height grow light of claim 1, further including a third axle, wherein said second line is routed over said third axle and is thereafter downwardly disposed toward said light fixture.

6. The adjustable height grow light of claim 1, wherein each of said axles includes an axle sleeve rotatably positioned on each of said axles.

7. The adjustable height grow light of claim 1, further including a coupling block for connecting said first and second lines to said ribbon torsion spring.

8. The adjustable height grow light of claim 7, wherein said coupling block includes means for adjusting the uppermost position and the vertical range of movement of said light fixture.

9. The adjustable height grow light of claim 8, wherein said adjustment means comprises a bolt threadably driven into said coupling block, and wherein said bolt may be loosened to let out or take up slack in said first and second lines.

10. The adjustable height grow light of claim 9, wherein said spring and line adjustment means comprises:

an adjustment bolt threadably driven into said coupling block;

a connector connected to said second axle;

a third line fastened at one end to said adjustment bolt and at the other end to said connector;

wherein said adjustment bolt may be loosened to allow slack to be taken up or let out in said first, second, and third lines, and wherein said ribbon spring is extended as slack is taken up in said third line and retracts as slack is let our of said third line.

11. The adjustable height grow light of claim 1, wherein said axles are positioned in series, parallel to and in varying proximity to said ribbon torsion spring axle, said first axle being most proximate said ribbon spring axle.

12. An adjustable height grow light, comprising:

a horizontal support adaptable for connection to a support, said horizontal support defining a downwardly depending interior channel;

a spring axle secured with the interior channel of said horizontal support;

a constant force ribbon torsion spring mounted on said spring axle, wherein said spring is able to extend from said spring axle and to retract thereto from an extended position;

at least two line axles set within the interior channel and spaced apart from said spring axle and from one another;

a light fixture adapted for holding grow light bulbs; and a line assembly including at least two lines, each of said lines connected at one end to said ribbon torsion spring and at the other end to said light fixture, and routed over said line axles such that when said ribbon torsion spring is extended or retracted, each of said lines is let out or taken in in substantially the same amount and said light fixture remains in a substantially level position while moving within a defined range of vertical movement.

13. The adjustable height grow light of claim 12, wherein said constant force ribbon torsion spring is tension rated at or above the weight of said lines and said light fixture and grow lights contained therein.

14. The adjustable height grow light of claim 12, wherein said line axles comprise a first line axle and a second line axle, and wherein said line assembly comprises a first line and a second line.

15. The adjustable height grow light of claim 14, wherein said first line axle is more proximate said ribbon spring axle than said second line axle, and wherein said first line extends from said ribbon torsion spring, over said second line axle and back over said first line axle, and is thereafter downwardly disposed to said light fixture; and wherein said second line extends from said ribbon torsion spring, over said second line axle and is thereafter downwardly disposed to said light fixture.

16. The adjustable height grow light of claim 12, further including a coupling block for connecting said lines to said ribbon torsion spring.

17. The adjustable height grow light of claim 16, further including adjustment means wherein the uppermost point of the range of vertical movement and the range of vertical movement of said light fixture may be adjusted.

18. The adjustable height grow light of claim 17, wherein said adjustment means comprises a bolt connected to said coupling block, wherein said bolt may be loosened to permit slack in said lines to be taken up or let out.

19. The adjustable height grow light of claim 12, wherein said light is adapted for suspension from or connection to a ceiling.

* * * * *